US011696185B2

(12) United States Patent
Cyril et al.

(10) Patent No.: US 11,696,185 B2
(45) Date of Patent: Jul. 4, 2023

(54) DYNAMIC PROVISIONING RECONCILIATION OF NETWORK ELEMENTS IN WIRELESS COMMUNICATION NETWORKS

(71) Applicant: T-Mobile USA, Inc., Bellevue, WA (US)

(72) Inventors: Henry Cyril, Bothell, WA (US); Murugappan Palaniappan, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 283 days.

(21) Appl. No.: 17/202,025

(22) Filed: Mar. 15, 2021

(65) Prior Publication Data
US 2022/0295351 A1    Sep. 15, 2022

(51) Int. Cl.
*H04W 28/24* (2009.01)
*H04W 48/18* (2009.01)
*H04W 28/02* (2009.01)
*H04W 4/24* (2018.01)
*H04W 8/18* (2009.01)

(52) U.S. Cl.
CPC ............. *H04W 28/24* (2013.01); *H04W 4/24* (2013.01); *H04W 8/18* (2013.01); *H04W 28/0268* (2013.01); *H04W 48/18* (2013.01)

(58) Field of Classification Search
CPC ......... H04W 28/24; H04W 4/24; H04W 8/18; H04W 28/0268; H04W 48/18; H04M 15/41; H04M 15/62; H04M 15/70; H04M 15/73
See application file for complete search history.

(56) References Cited

U.S. PATENT DOCUMENTS

| 2010/0192212 A1* | 7/2010 | Raleigh | H04W 12/08 726/7 |
| 2011/0082779 A1* | 4/2011 | Wong | G06Q 20/40 705/34 |
| 2016/0094395 A1* | 3/2016 | Hu | H04W 4/60 370/254 |
| 2016/0227045 A1* | 8/2016 | Hunt | H04M 3/42297 |

FOREIGN PATENT DOCUMENTS

WO    WO-2013173270 A2 *   11/2013    ........... G06Q 20/123

* cited by examiner

*Primary Examiner* — Ashley Shivers
(74) *Attorney, Agent, or Firm* — Lee & Hayes, P.C.

(57) ABSTRACT

Systems and methods discussed herein are directed to a reconcile decision engine in communication with a network provisioning catalog. The network provisioning catalog may provide network elements of the wireless communication network related to the user service attributes, e.g., network elements that implement various aspects of the user service attributes to provide services to users in accordance with service plans (also referred to as rate plans). The network provisioning catalog also provides required network service attributes for each network element, where the required network service attributes are related to the user service attributes. The reconcile decision engine may query various network elements to reconcile the various network elements with respect to user information, e.g., the user's billing profile. The reconcile decision engine may reconcile the user profile with respect to one or more of the network elements that need reconciliation.

20 Claims, 5 Drawing Sheets

DYNAMIC PROVISIONING RECONCILIATION OF NETWORK ELEMENTS IN WIRELESS COMMUNICATION NETWORKS

BACKGROUND

A user's profile needs to be consistent across network elements of a wireless communication network. Since there are numerous network elements, e.g., different servers, that provide services in the wireless communication network, the user's profile at each network element must match the appropriate user profile. The appropriate user's profile is generally that which is included within the wireless communication network's billing system. Thus, if a user is experiencing a problem with a service of the wireless communication network, it may be due to the user's profile not being correct within one or more of the network elements, e.g., one or more servers responsible for providing the service to the user.

For example, for texting services, a first network element may handle short message service (SMS) messages, a second network element may handle multi-media messaging service (MMS) messages, while a third set of servers may handle rich communication services (RCS). If a user of the wireless communication network has problems with any of the services, the user may contact an operator of the wireless communication network. For example, the user may contact the operator of the wireless communication network and indicate that they have a problem with MMS. A customer service representative may then try to fix the problem manually based on a few suggestions in a customer service manual. If the customer service representative is unable to fix the problem, then the customer service representative may open a "fix it" ticket and a member of a technical care team, e.g., a technician, may then try to fix the problem. The technician may perform provisioning behind the scenes in order to fix the problem and may investigate the various network elements (including the user's profile at each network element) involved in providing MMS to the user. This is a very time-consuming process. One drastic option for fixing the problem may be to do a full reactivation of the service. For example, the technician may deactivate the service and then reactivate the service for the user. However, this can result in deletion of the user's data, including for example, previous messages, profiles, contact info, etc.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques and architecture are described herein for dynamic provisioning of service and/or rate plans among network elements of a wireless communication network. The dynamic provisioning may include reconciling user profiles among the network elements.

In accordance with configurations, a reconcile decision engine may be implemented on a wireless communication network's network provisioning engine (NPE). The reconcile decision engine may be in communication with a network provisioning catalog. The reconcile decision engine may also be in communication with various brands of the wireless communication network. The brands may provide information with respect to service plans, e.g., products, and billing information to the reconcile decision engine in the form of user service attributes. The network provisioning catalog may provide information with respect to the expected services and rate plans to the reconcile decision engine. In particular, the network provisioning catalog may provide network elements of the wireless communication network related to the user service attributes, e.g., network elements that implement various aspects of the user service attributes to provide services to users in accordance with service plans (also referred to as rate plans). The network provisioning catalog may also provide required network service attributes for each network element, where the required network service attributes are related to the user service attributes.

If an issue arises with respect to a service for a user, the reconcile decision engine may query various network elements (NEs) to reconcile the various network elements with respect to user information, e.g., the user's billing profile. Thus, the user's profile, information with respect to various services provided to the user, billing information, and various other types of information should be consistent across the network elements. If a discrepancy is found by the reconcile decision engine with respect to a user's profile at a network element, then the reconcile decision engine may reconcile the user profile with respect to one or more of the network elements that need reconciliation.

Thus, in configurations, the reconcile decision engine may include various reconcile rules in order to determine what corrective action or reconciliation action needs to be taken. For example, a reconcile rule may be that if the user profile in the network element "as-is," e.g., a network service attribute, is what is expected, e.g., an expected profile (a user service attribute), e.g., consistent with the user's billing profile, then no action needs to be taken. However, if the user profile at a network element has a value as-is that does not match up with the expected user profile, then the reconcile decision engine may update the user profile at the affected network element with the correct user profile.

As another example, a reconcile rule may include that if the as-is user profile does not equal the expected user profile, then the reconcile decision engine may delete the user profile from the network element and recreate the user profile at the affected network element. In configurations, the corrective action may be handled automatically by the reconcile decision engine or may be manually handled by a technician. Another example of a reconcile rule may include leaving the as-is user profile unchanged even if the as-is user profile does not match the expected user profile.

Thus, the techniques and architecture described herein provide a method that comprises receiving, at a reconcile decision engine, a first request for a reconciliation between a user billing profile and a user network profile, wherein the first request is based at least in part on a second request for a product related to a service within a wireless communication network, and wherein the first request comprises one or more user service attributes that are based at least in part on the product. The method also comprises sending, by the reconcile decision engine to a network provisioning catalog, the one or more user service attributes and receiving, by the reconcile decision engine from the network provisioning catalog, (i) network elements of the wireless communication network related to the user service attributes and (ii) required network service attributes for each network element, where the required network service attributes are related to the user service attributes. The method further comprises querying, by the reconcile decision engine, the network elements for current network service attributes corresponding to the required network service attributes and receiving, by the reconcile decision engine from the network elements, current network service attributes. The method also comprises comparing, by the reconcile decision engine, the required network service attributes with the current network service attributes. The method further comprises, based at least in part on a first current network service attribute at a first network element not matching a corresponding first required network service attribute, performing a reconciliation action with respect to the first current network service attribute on the first network element.

Figure 1A:
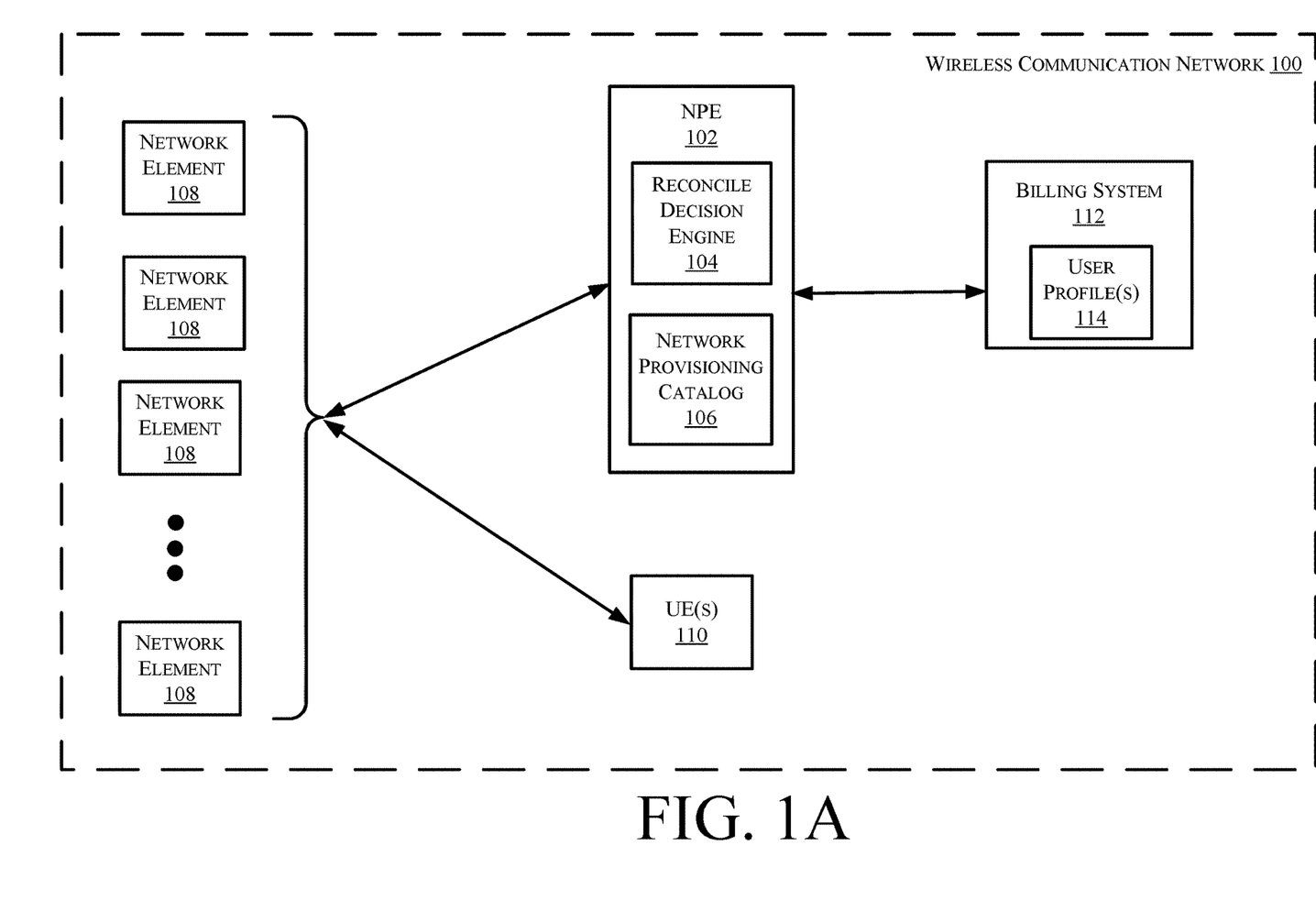
FIGS. 1A and 1B schematically illustrate a portion of an example wireless communication network and a platform for reconciling profiles at network elements in the example wireless communication network, in accordance with various configurations.

FIG. 1A schematically illustrates a wireless communication network 100 that includes various components. The wireless communication network 100 includes a network provisioning engine (NPE) 102, which implements a reconcile decision engine 104 and a network provisioning catalog 106. The wireless communication network 100 further includes multiple sets of network elements (NEs) 108, e.g., servers, that provide services to UEs 110 within the wireless communication network 100. A billing system 112 includes user profiles 114 corresponding to users of the UEs 110. As is known, there are generally many more components within the wireless communication network 100 that are not illustrated in FIG. 1A for clarity purposes.

The NPE 102 is a provisioning system that receives the provisioning transactions from the billing system 112. The NPE 102 translates the list of user facing specification (UFS) (e.g., user service attributes) that the NPE 102 receives from the billing system 112 and converts the user facing specification to a network facing specification (NFS) (e.g., network service attributes), e.g., a user network profile, based on a look-up in the network provisioning catalog 106. In configurations, the NPE 102 maintains separate catalogs in the network provisioning catalog 106 for attributes for each brand and sub-brand, as well as common attributes for the wireless communication network 100.

Examples of network elements include Home Location Register/Home Subscriber Server (HLR/HSS), Charging System (CS), Policy Enforcement Server (NAP), Short Message Service Server (SMS), Voice Mail Server (VMS), EPOCH, GFLEX, IP Management System (IPM), Caller Tunes (CTUNES), XDMS, MSTORE, Web Services Gateway (WSG), Over the Air (OTA) System, etc.

The UEs 110 are configured to operate within the wireless communication network 100 according to one or more operating protocols. In configurations, the wireless communication network 100 and the UEs 110 may be configured to operate according to one or more operating protocols including, but not limited to, Global System for Mobile Communications (GSM), Time Division Multiple Access (TDMA), Universal Mobile Telecommunications System (UMTS), Evolution-Data Optimized (EVDO), 3G, 4G, 5G, Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology, and/or the like.

The UEs 110 may be implemented as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, a motor vehicle, and/or similar mobile devices. In configurations, the UEs 110 may be implemented as an Internet of things (IoT) device (also known as a machine-to-machine (M2M) device) configured to operate within the wireless communication network 100. Although this description predominantly describes the UE 110 as being "mobile" (i.e., configured to be carried and moved around), it is to be appreciated that the UEs 110 may represent various types of communication devices that are generally stationary as well, such as televisions, appliances, desktop computers, game consoles, set top boxes, and the like. In this sense, the terms "communication device," "wireless device," "wireless communication device," "wireline device," "mobile device," "mobile communication device," "computing device," "mobile computing device," and "user equipment (UE)" may be used interchangeably herein to describe any communication device capable of performing the techniques described herein. Furthermore, the UEs 110 may be capable of communicating over wired networks, and/or wirelessly using any suitable wireless communications/data technology, protocol, or standard, such as those mentioned above. As is known, there are generally numerous UEs 110 operating within the wireless communication network 100.

In accordance with configurations, if an issue arises with respect to a service for a user of a UE 110, the reconcile decision engine 104 may query various network elements 108 to reconcile the various network elements 108 with respect to user information, e.g., the user's profile 114. Thus, the user's profile 114, information with respect to various services provided to the user, billing information, and various other types of information should be consistent across the network elements 108. If a discrepancy is found by the reconcile decision engine 104 with respect to a user's profile 114 at a network element 108, then the reconcile decision engine 104 may reconcile the user profile 114 with respect to one or more of the network elements 108 that need reconciliation.

Figure 1B:
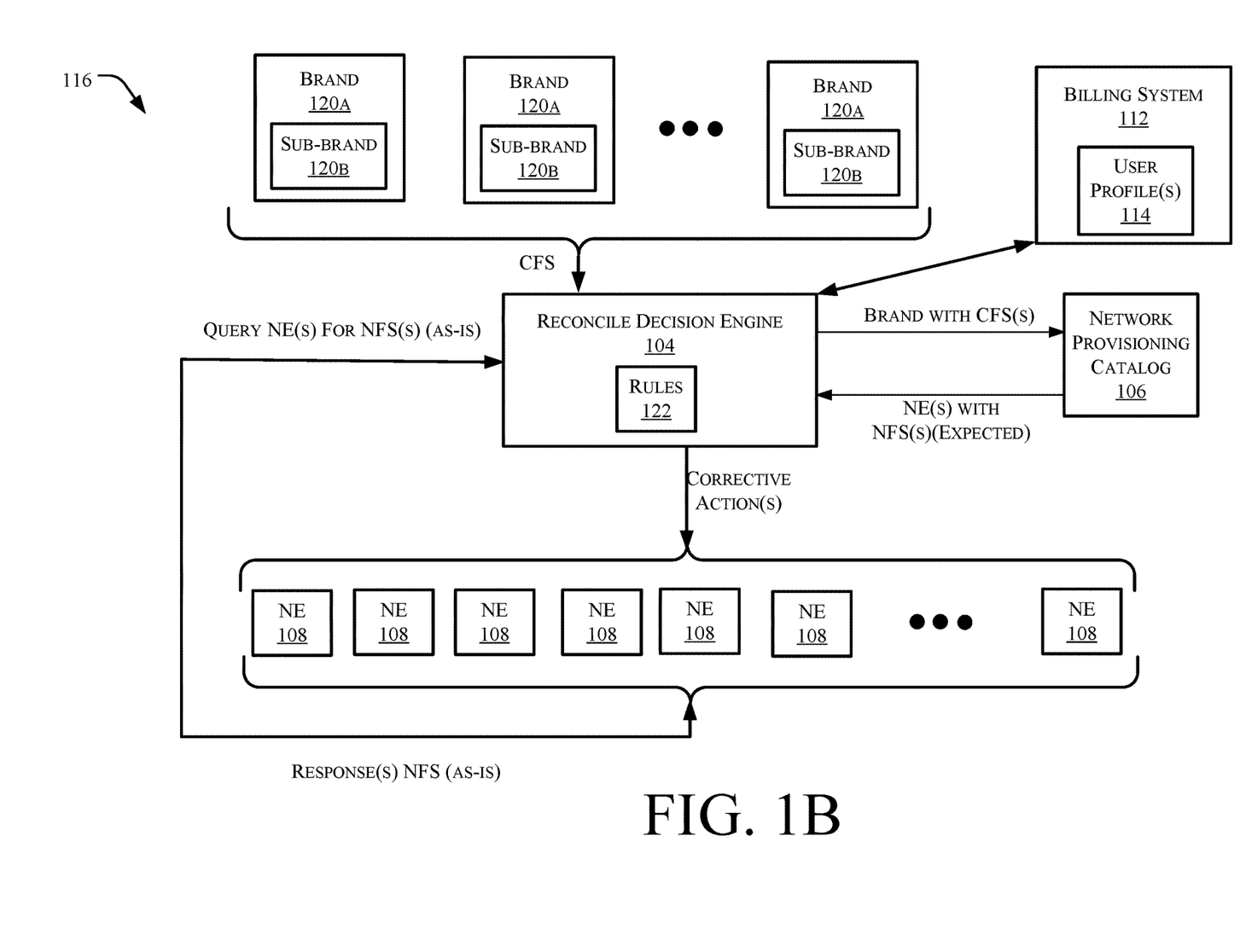

FIG. 1B schematically illustrates a platform or arrangement 116 for reconciling profiles at network elements 108, e.g., servers, or other hardware elements that implement the services for UEs 110 operated by users within the wireless communication network 100. The platform 116 includes multiple brands 118 that may provide information to the reconcile decision engine 104 relating to various services and billing plans for UEs 110 and users in the wireless communication network 100. The provisioning catalog 106 provides information for the services and rate plans to the reconcile decision engine 104, as will be discussed further herein. In configurations, a brand 118 may include one or more sub-brands 120. For example, a brand 118a may include a sub-brand 120a that provides consumer services for UEs 110, e.g., wireless communication devices, and a sub-brand 120b that provides services to users for UEs 110 configured as Internet-of-Things (IoT) devices.

In a typical transaction, the billing system 112 identifies a brand 120a (and optionally a sub-brand 120b) and provides a billing payload (e.g., user profile 114) as one or more features with optional attributes. In configurations, the NPE 102 uses the brand and sub-brand as primary keys to access a specific catalog in the network provisioning catalog 106. The features and optional attributes are used to identify the network elements 108 (e.g., network nodes) impacted and the network payload to send to each network element 108. An example list of typical transactions includes activation, deactivation, port-in, port-out, update user profile, update feature, suspension, restore, change MSISDN, change SIM, change bill cycle, BAN to BAN change, add/deduct balance, voicemail PIN reset, etc. These transactions are triggered from a billing/user management system for any voluntary & involuntary transaction. Each transaction updates the network profile of a user, which updates the services of the user. An example list of typical services includes voice, international voice, roaming international/domestic, call forwarding, call waiting capability, SMS, multi-media messaging service (MMS), rich communication services (RCS), data domestic, data hotspot, data roaming, voicemail, static IP management.

Each brand 120a and sub-brand 120b offers rate plans where each one defines one or more features. Each feature is defined by a UFS. Each UFS requires one or more network elements 108 to be provisioned, where each network element 108 may be referred to as a resource facing specification (RFS) that corresponds to the user facing specifications. The feature in each network element 108 is defined by a set of key value pairs, which may be referred to as logical resource specifications (LRS).

A cross-brand catalog is maintained by the network provisioning catalog 106 that captures the relationship for each rate plan (UFS->RFS->LRS). The network provisioning catalog 106 is updated in memory to speed up the provisioning process. Examples of UFSs include VOICE_MO_NAT (identifying outgoing call feature within the US), CFW (identifying call-forwarding feature), and TETH_10 GB_CAP (identifying tethering up to 10 GB data that is capped once that limit is reached). Each UFS is associated with one more RFSs that identifies the network element 108 whose subscriber profile needs to be updated. For example, in the VOICE_MO_NAT and CFW features, the only RFS network element 108 may be the HLR/HSS, whereas the TETH_10 GB_CAP feature needs updating of RFS network elements 108 in the HLR/HSS, NAP, and CS. Each RFS is associated with one or more LRSs that identifies the name and value that needs to be set in each network element 108. For example, in the VOICE_MO_NAT, the name value pairs that need to be set in the HLR/HSS includes ts11=0 and odboc=4 meaning the user can make outgoing calls. In the TETH_10 GB_CAP example, the thresholds identifier that holds the 10 GB bucket needs to be set in CS and the capped behavior to enforce needs to be set in the NAP. The network provisioning catalog 106 has these mappings identifying the various combinations of brand 120a, sub-brand 120b, UFS, RFS, NFS that may be arranged in a logical in-memory cache layout that may then be updated individually. In configurations, brand, sub-brand, and UFS may be used as the logical combination.

In configurations, a rules table 122 may be used by the reconcile decision engine 104 to reconcile a billing profile (e.g., user profile 114) of a user provided by the billing system 112 with the affected network elements 108 based on the RFSs and the NFSs provided by the network provisioning catalog 106. An example of a rules table is provided in Table 1 and will be discussed further herein.

TABLE 1

RECONCILE RULES

| Case | NE | What Changed? | Corrective Action | Priority |
|---|---|---|---|---|
| a. As-is = Expected | NE 1 | NA | No updates | |
| b. As-is ≠ Expected | NE 2 | Attribute 1 | Update Profile | |
| b. As-is ≠ Expected | NE 3 | Attribute 2 | Delete & Re-Create | |
| b. As-is ≠ Expected | NE 4 | Attribute 1 | Ignore (No Updates) | |
| b. As-is ≠ Expected | NE 5 | Attribute 2 | Delete & Re-Create | High |
| ... | | | | |
| As-is ≠ Expected | NE n | Attribute n | Any | |

Thus, in configurations, a billing/user management system (e.g., billing system 112) that holds the profile of a user may make a reconcile API request by sending a list of current features in a billing payload. The payload contains UFS 1, UFS 2, UFS 3, UFS n. The reconcile decision engine 104 may make a request to the network provisioning catalog 106 by sending the list of UFSs. The network provisioning catalog 106 may return a list of network elements 108 (RFSs) and network service profile attributes (NFSs) associated with each network element 108. Based on the response from the network provisioning catalog 106 for the list of network elements 108, the reconcile decision engine queries all of the received network elements 108 for the provisioned attributes (NFSs) of the MSISDN/subscriber, e.g., the user. The reconcile decision engine 104 compares the NFSs received from the network provisioning catalog 106 for the network Elements 108 and attributes (expected) profile of NFSs with attributes (as-is) profile of NFSs included in the responses to the queries from each network element 108. The reconcile decision engine determines if an as-is profile at a network element 108 matches an expected profile and based on the rules in the rules table 122, determines what corrective action needs to be taken.

For example, if the as-is profile and the expected profile are the same, the reconcile decision engine 104 may be configured to perform no updates action towards the particular network element 108. Hence, the profile in the network element 108 is left unchanged. However, if the as-is profile and the expected profile are different, then the reconcile decision engine 104 may validate against each attribute for a corrective action. If the corrective action only requires an update of the attribute, the reconcile decision engine flag the network element 108 for one or more updates of attributes. For example, if the SMSC's sub-profile ID is different, it can be fixed through an update profile request. In configurations, the reconcile decision engine 104 may perform the update of the network element 108.

In another example, if the as-is profile and the expected profile are different, if the attributes cannot be updated, then based on the rules defined, the network element 108 may be deleted and created sequentially without any user service outage. For example, if the NAP user ID is different, the NAP user ID may be fixed in such a manner.

In a further example, if the as-is profile and the expected profile are different, there may be some cases that attributes are different but the attributes may continue to be different and the attributes are not required to be corrected, e.g., the as-is profile does not need to be reconciled with the expected profiles. In this example, the action "Ignore" may be configured in the reconcile decision engine 104. For example, user defined configurations may be handled in this manner.

Also, for example, for the same network element 108, if there are more than one attribute changes or updates needed, the reconcile decision engine 104 may define and/or assign a priority for changing the attributes. Thus, the reconcile decision engine may decide which attributes are to be changed and/or in what order the attributes are to be changed based on the priorities.

The rules discussed herein are example rules described to explain the techniques described herein. However, the rules may be extended to define any number of custom rules. Once the rules are evaluated, the reconcile decision engine 104 may execute appropriate corrective action in-parallel towards all affected network elements 108 and responds back to the billing system 112. Note that the techniques described herein may be used when new service is provisioned within the wireless communication network 100 and/or when new service is added or deleted from a provisioned plan within the wireless communication network 100. The techniques may be in response to a request from, for example, the billing system 112, a user (e.g., an external trigger), a technician, a customer representative, a network element 108, etc.

Figure 2:
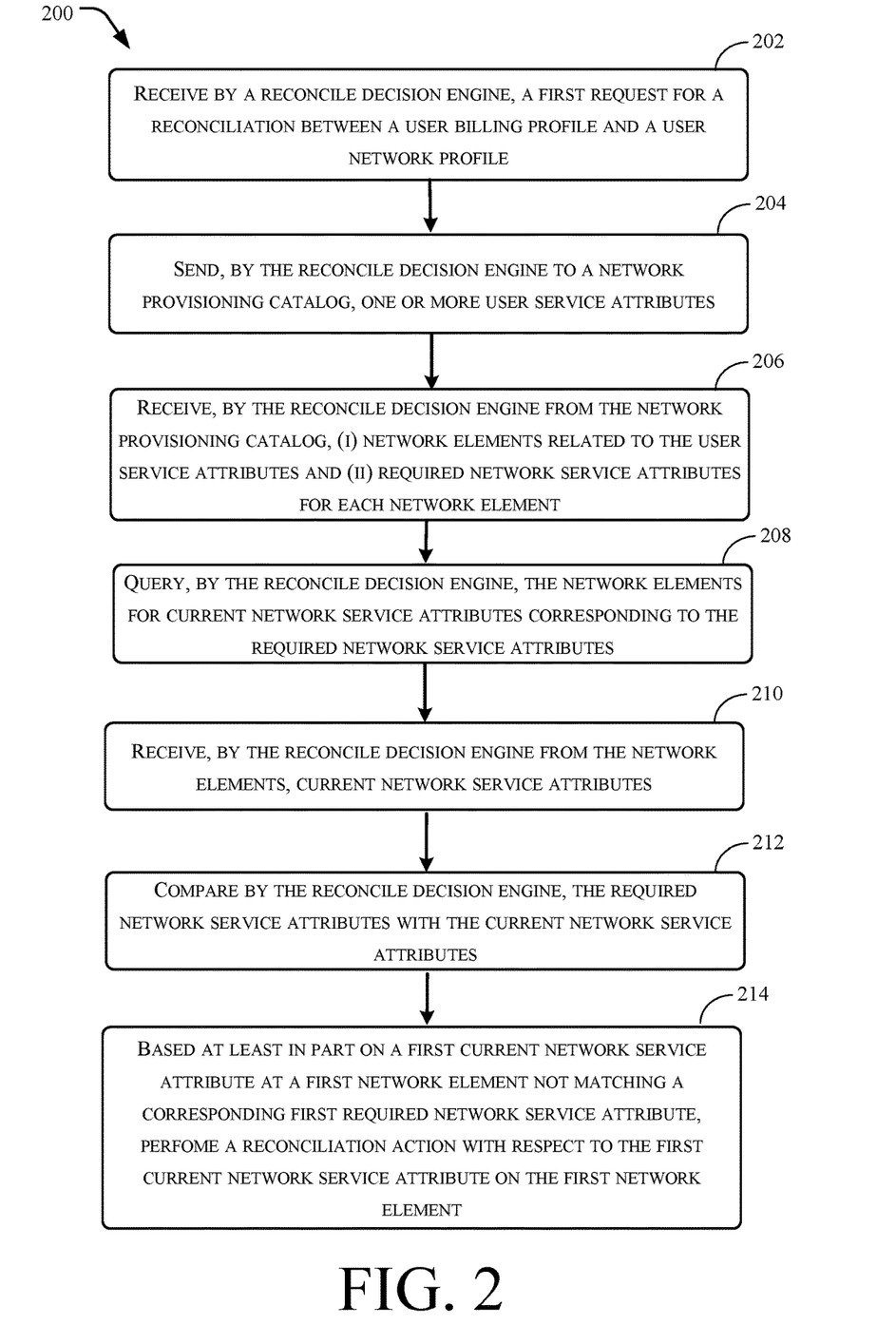
FIG. 2 is a flow diagram of an example process for dynamic provisioning of service and/or rate plans among network elements of a wireless communication network of FIGS. 1A and 1B, in accordance with various configurations.

FIG. 2 is a flow diagram of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices FIG. 2 is a flow diagram of an example process 200 for dynamic provisioning of service and/or rate plans among network elements of a wireless communication network. At block 202, a reconcile decision engine, e.g., reconcile decision engine 104, receives a first request for a reconciliation between a user billing profile and a user network profile. The first request is based at least in part on a second request for a product related to a service within a wireless communication network. The first request comprises one or more user service attributes that are based at least in part on the product. At block 204, the reconcile decision engine sends to a network provisioning catalog, e.g., network provisioning catalog 106, the one or more user service attributes.

At block 206, the reconcile decision engine receives from the network provisioning catalog (i) network elements, e.g., network elements 108, of the wireless communication network related to the user service attributes and (ii) required network service attributes for each network element, where the required network service attributes are related to the user service attributes. At block 208, the reconcile decision engine queries the network elements for current network service attributes corresponding to the required network service attributes. At block 210, the reconcile decision engine receives from the network elements, current network service attributes.

At block 212, the reconcile decision engine compares the required network service attributes with the current network service attributes. At block 214, based at least in part on a first current network service attribute at a first network element not matching a corresponding first required network service attribute, a reconciliation action is performed with respect to the first current network service attribute on the first network element.

While the techniques and architecture described herein have been primarily described with respect to a wireless communication network, those skilled in the art will recognize that the techniques and architecture are equally applicable to other types of networks that utilize application pods and containers to provide services to various devices.

Figure 3:
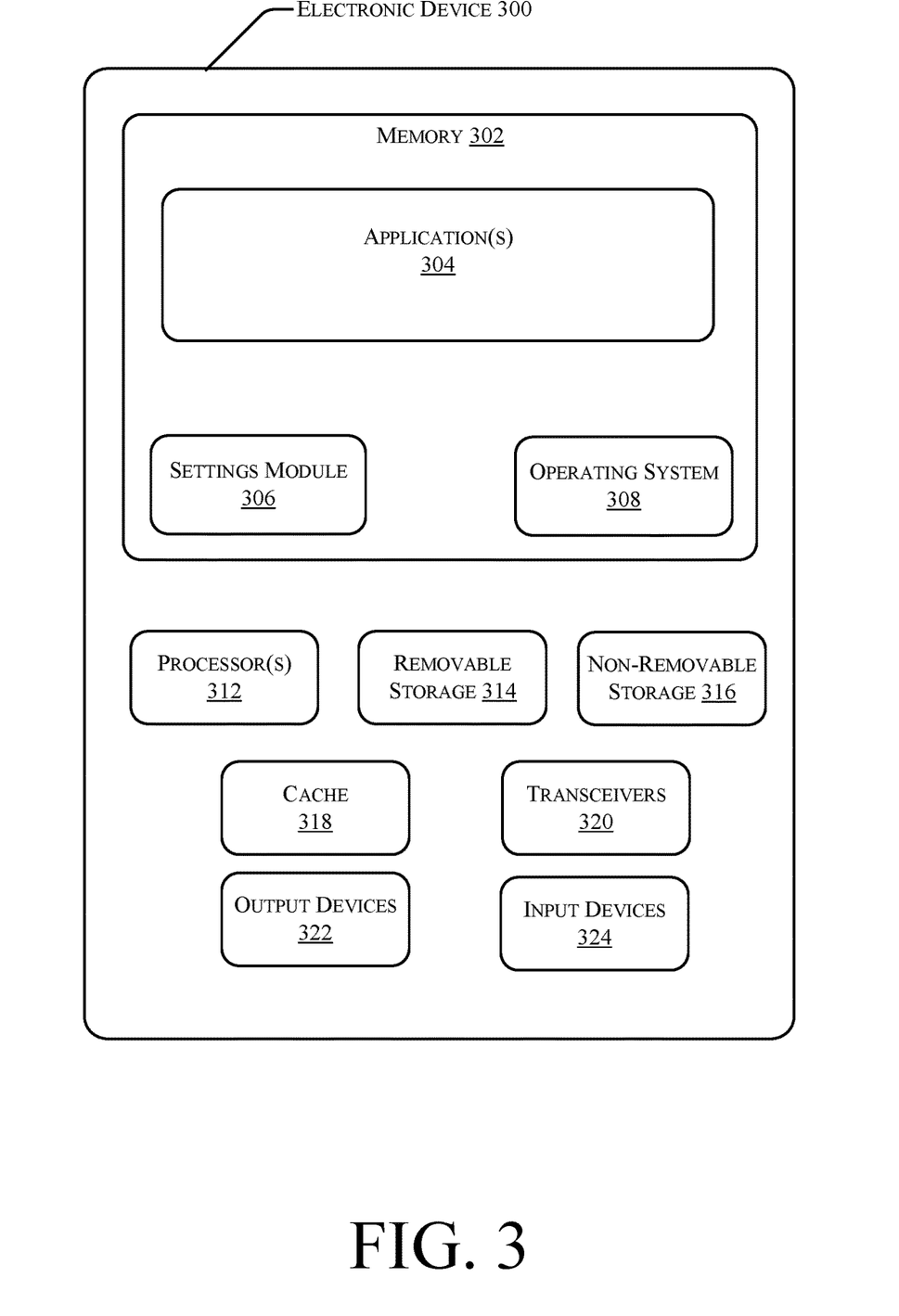
FIG. 3 schematically illustrates a component level view of an example electronic device configured for use in the wireless communication network of FIGS. 1A and 1B, in accordance with various configurations.

FIG. 3 schematically illustrates a component level view of an example electronic device 300, such as UE 110, configured to function within wireless communication network 100. The electronic device 300 may include more or less components depending on the type of electronic device. As illustrated, the electronic device 300 comprises a system memory 302, e.g., computer-readable media, storing application(s) 304. For example, the system memory 302 may include an application (app) configured to implement one or more functions with respect to RF signal level monitoring as described herein. The mobile device also comprises a settings module 306, and an operating system 308. Also, the electronic device 300 includes processor(s) 312, a removable storage 314, a non-removable storage 316, cache 318, transceivers 320, output device(s) 322, and input device(s) 324. In various implementations, system memory 302 is volatile (such as RAM), non-volatile (such as ROM, flash memory, etc.) or some combination of the two. In some implementations, the processor(s) 312 is a central processing unit (CPU), a graphics processing unit (GPU), or both CPU and GPU, or any other sort of processing unit.

The electronic device 300 may also include additional data storage devices (removable and/or non-removable) such as, for example, magnetic disks, optical disks, or tape. Such additional data storage may include removable storage 314 and non-removable storage 316. Additionally, the electronic device 300 includes cache 318.

Non-transitory computer-readable media may include volatile and nonvolatile, removable and non-removable tangible, physical media implemented in technology for storage of information, such as computer readable instructions, data structures, program modules, or other data. System memory 302, removable storage 314, non-removable storage 316 and cache 318 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 300. Any such non-transitory computer-readable media may be part of the electronic device 300. The processor(s) 312 may be configured to execute instructions, which may be stored in the non-transitory computer-readable media or in other computer-readable media accessible to the processor(s) 312.

In some implementations, the transceivers 320 include any sort of transceivers known in the art. For example, the transceivers 320 may include a radio transceiver that performs the function of transmitting and receiving radio frequency communications via an antenna (not shown). Also, or alternatively, the transceivers 320 may include wireless modem(s) to facilitate wireless connectivity with other computing devices. Further, the transceivers 320 may include wired communication components, such as an Ethernet port, for communicating with other networked devices.

In some implementations, the output devices 322 include any sort of output devices known in the art, such as a display (e.g., a liquid crystal display), speakers, a vibrating mechanism, or a tactile feedback mechanism. Output devices 322 also include ports for one or more peripheral devices, such as headphones, peripheral speakers, or a peripheral display.

In various implementations, input devices 324 include any sort of input devices known in the art. For example, input devices 324 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 324 may be used to enter preferences of a user of the electronic device 300 to define how the user wishes certain calls from third parties to be handled by the wireless communication network, as previously described herein.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 302 is an example of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may various perform operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
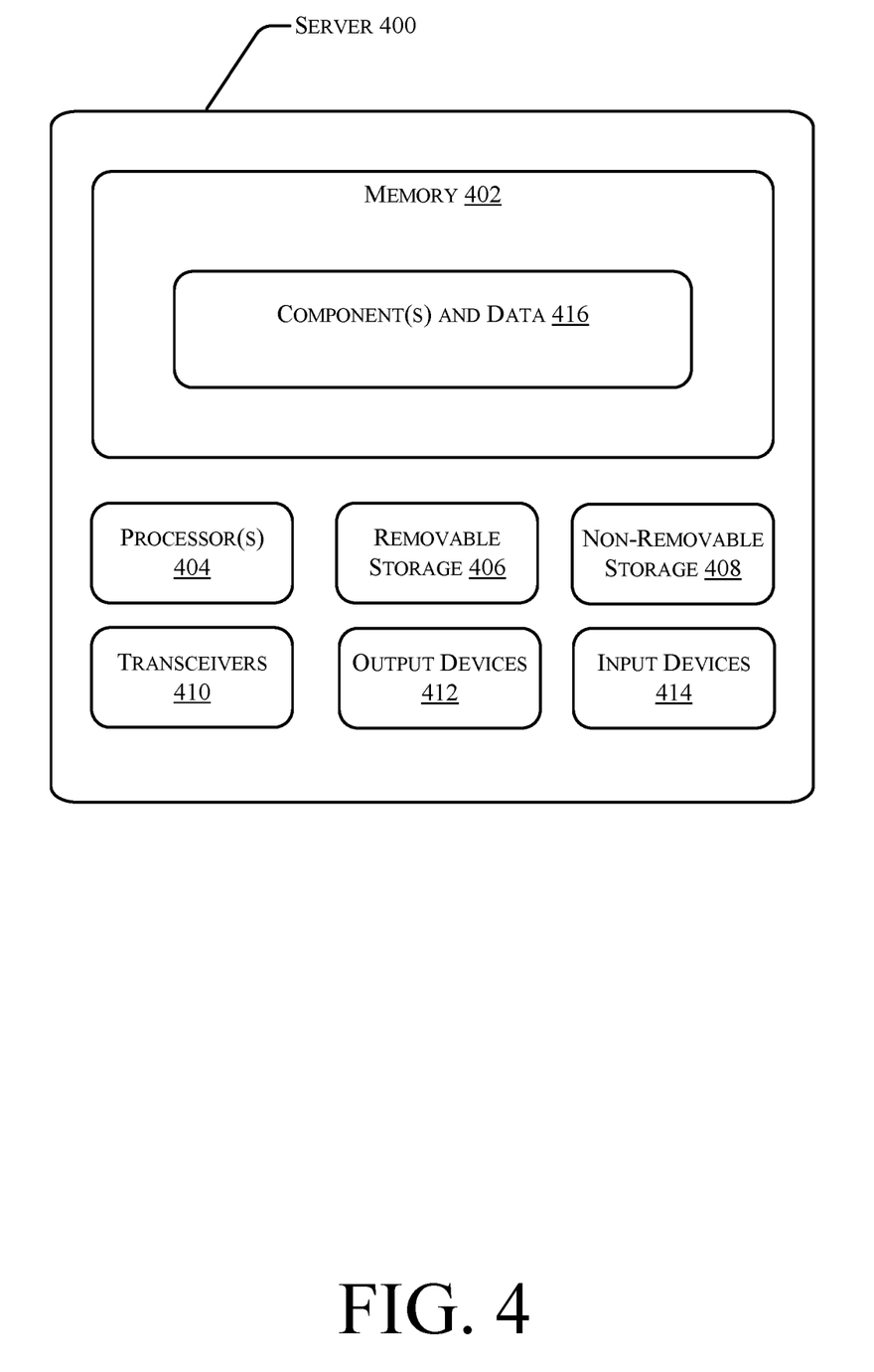
FIG. 4 schematically illustrates a component level view of a server configured for use in the wireless communication network of FIGS. 1A and 1B, in accordance with various configurations.

FIG. 4 illustrates a component level view of a server 400 configured for use within a wireless communication network, e.g., wireless communication network 100, in order to provide various services within the wireless communication network, according to the techniques described herein. For example, one or more servers 400 may be configured to implement one or more components of the network elements 108 and/or implement the NPE 102 including the reconcile decision engine 104 and the network provisioning catalog.

As illustrated, the server 400 comprises a system memory 402 that may store one or more components, modules, and/or applications and data 416 for interacting with electronic devices 300, e.g., UEs 110, or other electronic devices that may be configured as connected devices, as described herein. Also, the server 400 may include processor(s) 404, a removable storage 406, a non-removable storage 408, transceivers 410, output device(s) 412, and input device(s) 414.

In various implementations, system memory 402 is volatile (such as RAM), non-volatile (such as ROM, flash memory, etc.), or some combination of the two. In some implementations, the processor(s) 404 is a Central Processing Unit (CPU), a Graphics Processing Unit (GPU), or both CPU and GPU, or any other sort of processing unit.

The server 400 may also include additional data storage devices (removable and/or non-removable) such as, for example, magnetic disks, optical disks, or tape. Such additional storage is illustrated in FIG. 4 by removable storage 406 and non-removable storage 408. The one or more of the memory 402, the removable storage 406 and/or the non-removable 408 may include module(s) and data 416 (illustrated in the memory 402). The module(s) and data 416 may include instructions executable by, for example, the processor(s) 404.

Non-transitory computer-readable media may include volatile and nonvolatile, removable and non-removable tangible, physical media implemented in technology for storage of information, such as computer readable instructions, data structures, program modules, or other data. System memory 402, removable storage 406 and non-removable storage 408 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 410 include any sort of transceivers known in the art. For example, the transceivers 410 may include wired communication components, such as an Ethernet port, for communicating with other networked devices. Also, or instead of, the transceivers 410 may include wireless modem(s) to facilitate wireless connectivity with other computing devices. Further, the transceivers 410 may include a radio transceiver that performs the function of transmitting and receiving radio frequency communications via an antenna.

In some implementations, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various implementations, input devices 414 include any sort of input devices known in the art. For example, input devices 414 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 302 and memory 402 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1A, 1B, and 2. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

receiving, at a reconcile decision engine, a first request for a reconciliation between a user billing profile and a user network profile, wherein the first request is based at least in part on a second request for a product related to a service within a wireless communication network, and wherein the first request comprises one or more user service attributes that are based at least in part on the product;

sending, by the reconcile decision engine to a network provisioning catalog, the one or more user service attributes;

receiving, by the reconcile decision engine from the network provisioning catalog, (i) network elements of the wireless communication network related to the user service attributes and (ii) required network service attributes for each network element, the required network service attributes being related to the user service attributes;

querying, by the reconcile decision engine, the network elements for current network service attributes corresponding to the required network service attributes;

receiving, by the reconcile decision engine from the network elements, current network service attributes;

comparing, by the reconcile decision engine, the required network service attributes with the current network service attributes; and based at least in part on a first current network service attribute at a first network element not matching a corresponding first required network service attribute, performing a reconciliation action with respect to the first current network service attribute on the first network element.

2. The method of claim 1, wherein receiving the first request for the reconciliation between the user billing profile and the user network profile comprises receiving, at the reconcile decision engine from a billing system of the wireless communication network, the first request for the reconciliation between the user billing profile and the user network profile.

3. The method of claim 1, wherein receiving the first request for the reconciliation between the user billing profile and the user network profile comprises receiving, at the reconcile decision engine, an external trigger for the first request for the reconciliation between the user billing profile and the user network profile.

4. The method of claim 1, wherein performing the reconciliation action with respect to the first current network service attribute on the first network element comprises updating the first current network service attribute with the corresponding first required network service attribute.

5. The method of claim 1, wherein performing the reconciliation action with respect to the first current network service attribute on the first network element comprises deleting the first network element and re-creating the first network element with the corresponding first required network service attribute.

6. The method of claim 1, wherein performing the reconciliation action with respect to the first current network service attribute on the first network element comprises using the first current network service attribute as the corresponding first required network service attribute.

7. The method of claim 6, wherein the first current network service attribute comprises a user defined configuration.

8. The method of claim 1, wherein the reconciliation action is a first reconciliation action and the method further comprises:
  based at least in part on a second current network service attribute at the first network element not matching a corresponding second required network service attribute, performing a second reconciliation action with respect to the second current network service attribute on the first network element;
  assigning a first priority to the first reconciliation action;
  assigning a second priority to the second reconciliation action; and
  performing the first reconciliation action and the second reconciliation action in an order based at least in part on the first priority and the second priority.

9. A non-transitory storage medium comprising instructions stored thereon, the instructions being executable by one or more processors to perform actions comprising:
  receiving a first request for a reconciliation between a user billing profile and a user network profile, wherein the first request is based at least in part on a second request for a product related to a service within a wireless communication network, and wherein the first request comprises one or more user service attributes that are based at least in part on the product;
  sending, to a network provisioning catalog, the one or more user service attributes;
  receiving, from the network provisioning catalog, (i) network elements of the wireless communication network related to the user service attributes and (ii) required network service attributes for each network element, the required network service attributes being related to the user service attributes;
  querying the network elements for current network service attributes corresponding to the required network service attributes;
  receiving, from the network elements, current network service attributes;
  comparing the required network service attributes with the current network service attributes; and
  based at least in part on a first current network service attribute at a first network element not matching a corresponding first required network service attribute, performing a reconciliation action with respect to the first current network service attribute on the first network element.

10. The non-transitory storage medium of claim 9, wherein receiving the first request for the reconciliation between the user billing profile and the user network profile comprises receiving, from a billing system of the wireless communication network, the first request for the reconciliation between the user billing profile and the user network profile.

11. The non-transitory storage medium of claim 9, wherein receiving the first request for the reconciliation between the user billing profile and the user network profile comprises receiving an external trigger for the first request for the reconciliation between the user billing profile and the user network profile.

12. The non-transitory storage medium of claim 9, wherein performing the reconciliation action with respect to the first current network service attribute on the first network element comprises updating the first current network service attribute with the corresponding first required network service attribute.

13. The non-transitory storage medium of claim 9, wherein performing the reconciliation action with respect to the first current network service attribute on the first network element comprises deleting the first network element and re-creating the first network element with the corresponding first required network service attribute.

14. The non-transitory storage medium of claim 9, wherein performing the reconciliation action with respect to the first current network service attribute on the first network element comprises using the first current network service attribute as the corresponding first required network service attribute.

15. The non-transitory storage medium of claim 14, wherein the first current network service attribute comprises a user defined configuration.

16. The non-transitory storage medium of claim 9, wherein the reconciliation action is a first reconciliation action and the actions further comprise:
  based at least in part on a second current network service attribute at the first network element not matching a corresponding second required network service attribute, performing a second reconciliation action with respect to the second current network service attribute on the first network element;
  assigning a first priority to the first reconciliation action;
  assigning a second priority to the second reconciliation action; and
  performing the first reconciliation action and the second reconciliation action in an order based at least in part on the first priority and the second priority.

17. An apparatus comprising:
  one or more processors; and a non-transitory storage medium comprising instructions stored thereon, the instructions being executable by the one or more processors to cause the processors to perform one or more actions comprising:
  receiving a first request for a reconciliation between a user billing profile and a user network profile, wherein the first request is based at least in part on a second request for a product related to a service within a wireless communication network, and wherein the first request comprises one or more user service attributes that are based at least in part on the product;
  sending, to a network provisioning catalog, the one or more user service attributes;
  receiving, from the network provisioning catalog, (i) network elements of the wireless communication network related to the user service attributes and (ii) required network service attributes for each network element, the required network service attributes being related to the user service attributes;
  querying the network elements for current network service attributes corresponding to the required network service attributes;
  receiving, from the network elements, current network service attributes;
  comparing the required network service attributes with the current network service attributes; and
  based at least in part on a first current network service attribute at a first network element not matching a corresponding first required network service attribute, performing a reconciliation action with respect to the first current network service attribute on the first network element.

18. The apparatus of claim 17, wherein receiving the first request for the reconciliation between the user billing profile and the user network profile comprises receiving, from a billing system of the wireless communication network, the first request for the reconciliation between the user billing profile and the user network profile.

19. The apparatus of claim 17, wherein receiving the first request for the reconciliation between the user billing profile and the user network profile comprises receiving an external trigger for the first request for the reconciliation between the user billing profile and the user network profile.

20. The apparatus of claim 17, wherein performing the reconciliation action with respect to the first current network service attribute on the first network element comprises updating the first current network service attribute with the corresponding first required network service attribute.

* * * * *